(12) United States Patent
Malone

(10) Patent No.: US 6,254,652 B1
(45) Date of Patent: Jul. 3, 2001

(54) AT LEAST THREE-STEP MOLTEN METAL DECOMPOSITION PROCESS CYCLE

(75) Inventor: Donald P. Malone, Grayson, KY (US)

(73) Assignee: Marathon Ashland Petroleum LLC, Findlay, OH (US)

( * ) Notice: Subject to any disclaimer, the term of this patent is extended or adjusted under 35 U.S.C. 154(b) by 0 days.

(21) Appl. No.: 09/308,530
(22) PCT Filed: Nov. 25, 1996
(86) PCT No.: PCT/US96/19115
    § 371 Date: May 18, 1999
    § 102(e) Date: May 18, 1999
(87) PCT Pub. No.: WO98/23709
    PCT Pub. Date: Jun. 14, 1998

Related U.S. Application Data

(63) Continuation-in-part of application No. 08/421,102, filed on Apr. 13, 1995, now Pat. No. 5,577,346.

(51) Int. Cl.[7] .................................................. C10J 3/57
(52) U.S. Cl. ....................... 48/197 R; 48/92; 48/198.2; 75/429; 75/529; 266/217
(58) Field of Search .................. ; 48/197 R, 92, 48/198.2, 199 FM; 75/414, 446, 492, 529, 531; 266/216, 217; C10J 3/57

(56) References Cited

U.S. PATENT DOCUMENTS

| 4,187,672 | 2/1980 | Rasor . |
|---|---|---|
| 4,338,096 | 7/1982 | Mayes . |
| 4,511,372 | * 4/1985 | Axelsson ............ 48/197 R |
| 4,574,714 | 3/1986 | Bach et al. . |
| 4,602,574 | * 7/1986 | Bach et al. ............ 588/201 |

FOREIGN PATENT DOCUMENTS

| 1187785 | * 4/1970 | (GB) . |
| 2189504 | * 10/1987 | (GB) . |
| 93/25277 | * 12/1993 | (WO) . |
| 98/22385 | * 5/1998 | (WO) . |
| 98/04654 | * 12/1998 | (WO) . |

\* cited by examiner

Primary Examiner—Hien Tran
Assistant Examiner—Basia Ridley
(74) Attorney, Agent, or Firm—Richard D. Stone; Laurence P. Hobbes

(57) ABSTRACT

Sequential processing of hydrogen rich and hydrogen deficient feeds (14 and 16) in a heat balanced, single molten metal bath (40) to produce both 90+ mole % hydrogen (90) and one or more lower purity vapor streams (140) is disclosed. The molten metal bath is heated by oxygen addition (18) to burn dissolved carbon from the bath and then cooled by sequential addition of two feeds with differing hydrogen contents. Preferably a 98% hydrogen product with a pressure of at least 2 atm., absolute is obtained, along with a lower purity hydrogen containing stream and a separate carbon oxides flue gas stream.

13 Claims, 4 Drawing Sheets

AT LEAST THREE-STEP MOLTEN METAL DECOMPOSITION PROCESS CYCLE

CROSS REFERENCE TO RELATED APPLICATIONS

This application is a continuation-in-part of pior application U.S. Ser. No. 08/421,102, filed Apr. 13, 1995, now U.S. Pat. No. 5,577,346 granted Nov. 26, 1996.

BACKGROUND OF THE INVENTION

I. Field of the Invention

The present inventioln relates to the use of molten metal baths to treat waste streams, coal, garbage and the like.

II. Descripton of the Prior Art

There have been many attempts made at harnessing the power of molten metal baths to process coal, hydrocarbons, garbage, tires and the like. Molten iron is almost a universal solvent, able to rapidly decompose and/or convert a wide variety of difficutlt materials. As an example, consider coal processing. Coal is an inexpensive and readily available fuel. Unfortunately it is a dirty fuel. The coal can be burned, but doing so creates many environmental problems, including dust, NOx, SOx, and CO emissions.

Because coal is such a difficult feed, a summary of some coal conversion art follows. It should, however, be noted that the present invention is not limited to coal conversion. Coal, perhaps the most difficult fuel to process rather than butn, provides a good limiting case study oln hydrogen deficientt feeds, so a review of coal conversion art is instructive. This is followed by a review of art at producing hydrogen from clean fuels such as methane. As will be seen, molten metal processing of these hydrogen-deficient, e.g., coal, and hydrogen-rich, e.g., methiane, feeds catise problems.

Coal can be converted at great expense to for valuable clean fuels or at lesser expense to cheap, dirty fuels. The high expense route to clean fuels involves gasification followed by Fisceher Tropsch synthesis. This approach works, and has been used commercially by those countries without a secure source of oil. The use of coal to form water gas or other low grade fuel which can be burned (with much of the contaminants still inl the gas) is a low tech, environmentally unsuitable way to get a gaseous fuel from a difficult solid.

One promising new approach is use of molten metal baths to process coal. Coal dissolution is rapid. Ash, if present, will from slag. The slag must be removed but, at least, the ash does not clog filters or slow coal processing. Hydrogen in the coal is rapidly released as hydrogen and usually just as rapidly burned because oxygen addition usually proceeds in lock step with carbon burning, and in the same bath of molten metal receiving coal.

U.S. Pat. Nos. 4,187,672 and 4,244,180 (Rasor) provide all example of this approach. Coal was fed to a bath of molten iron, and air introduced into the reactor to react with dissolved carbon to for hot fuel gas.

What is common to all molten metal processes converting coal, or other hydrogen-deficient fuel, is the processes generally produce excess heat and/or a dirty fuel gas product. In contrast, molten metal processing of clean fuels produces hydrogen or, at least, a cleaner fuel gas, and some heat input (or hydrogen combustion) is needed for heat balance.

A two-zone approach was used for methane conversion in U.S. Pat. No. 1,803,221. By separating the feed addition zone from the oxygen addition zone, it was possible to obtain a relatively pure hydrogen product from one zone.

Altough not primarily a coal conversion case, a promising approach involved use of a two-zone molten metal apparatus as disclosed in Miller et al., U.S. Pat. No. 5,435,814, which is incorporated by reference. A hydrogen- and carbon-containing feed was added to one pair of a circulatinig bath of molten iron, while oxygen or air was added to another part of the bath. A baffle separated the molten iron bath into two zones, a reducing zone (into which feed was added) and an oxidizing zone (into which $O_2$ was added). This allowed a heat-balanced operation to be achieved. Significant amounts of hydrogen-rich gas were produced in the reducing side via endothermic reactions while exothermic burning of dissolved carbon in the oxidizing side supplied the heat needed for the process. This isolation of feed dissolution (or more accurately, feed dissociation) from burning of dissolved carbon in a continuously cirlculating bed greatly improved the flexibility of the process and the value of the products.

Because the process in '814 was heat balanced, some care had to be taken to ensure that the process would operate continuously without external heating or cooling. The continuous process had to be thermally balanced to make sure that the bed did not get too hot or too cold.

Clean light feeds, such as methane, when charged to a continuous process generated large amounts of hydrogen (highly exothiermic) relative to the amount of carbon dissolved in the bath. Hydrogen-deficient feeds such as coal potentially added very little hydrogen to the bath, but large amounts of carbon. In short, if one wanted to get useflil products from both zones, it was difficult to operate with very clean, hydrogen-rich feeds (too endotherimic) or with dirty or hydrogen-deficient feeds (too exothermic).

Patentees have devised several ways to overcome this problem, mixing light and heavy feed, or adding CO or steam to the oxidizing side to promote other reactions which would keep things in heat balance.

While these approaches helped to a considerable extent, they all were somewhat restrictive in practice. If a refiner, or waste processor, had to dispose of some asphaltic feed, the "mixing" solution would make the feed lighter (or richer in hydrogen) by adding some lighter material such as methane. The methlane/asplhaltic "blend" would then be processed in the molten metal reactor, yielding a hydrogen product stream of intermediate purity. The hydrogen would be purer than could be obtained when processing an asphalt feedstock, but not as pure as when processing a methane feedstock.

We wanted more freedom than this in operating the unit. We wanted freedom to process both hydrogen-deficient and hydrogen-rich feeds while maintaining a heat-balanced operation. We discovered that it was possible to keep a heat-balanced operation while processing different quality feeds without mixing the feeds provided the feeds were charged to separate zones in the molten metal bath (or by short tenn blocked feed operation of two baths or even a single bath), and provided that the hydrogen-rich feed was charged to a zone uncontaminated with dirty feed and free of added oxygen.

By providing three separate zones, or rapidly cycling between three modes of operation in a single bath, we were able to obtain good hydrogen purities (during the relatively short periods when hydrogen-rich feed was processed) and intermediate hydrogen purities (when poor quality feed was processed). All this could be done in a heat-balanced unit.

When practiced in a continuous unit, such as that described and claimed in our parent patent, the hydrogen content in the gas produced in each dissociation zone is primarily indicative of the feed properties to each zone, while the carbon level increases slowly (for methane) or quickly (for SDA bottoms). The net amount of carbon added by both zones was appropriate for the amount of coke burned out of the molten metal bath in the oxidation zone.

When practiced in a multi-bed, e.g., three-bed unit, the feed and product lines associated with each zone will periodically shift from feed 1, to feed 2 to an oxidant.

When methane is feed 1, a relatively high purity hydrogen stream will be withdrawn from zone 1, but hydrogen purity will rapidly drop when a lower hydrogen content feed is charged to this zone.

When practiced in a single-vessel reactor, where the same vessel serves sequentially to process feed 1, then process feed 2, and then as a dissolved carbon-burning vessel, the same steps occur. The single vessel approach involves the lowest capital cost for a small unit, but may require means for dealing with abrupt changes in hydrogen purity and some periods of no hydrogen production. Compressors and gas storage facilities can be used to deal with the sudden swings in production.

By using two zones for feed dissociation, and a third zone for combustion of dissolved carbon, we were able to obtain a heat-balanced operation with disparate stocks, with peak hydrogen purity rathler than average hydrogen purity being achieved, at least, some of the time.

BRIEF SUMMARY OF THE INVENTION

Accordingly, the present invention provides a heat balanced, molten metal process for sequentially converting at least two different feedstocks, a hydrogen rich feed having a carbon:hydrogen mole ratio no greater than 1 and a hydrogen deficient feed havinig a carbon:hydrogen mole ratio greater than that of said hydrogen rich feed, in a single molten metal bath to produce at least two product vapor streams comprising heating a molten metal bath containing dissolved carbon by adding oxygen or an oxygen containing gas at an oxygen gas rate to said bath and exothermically oxidizing in said bath at least a portion of said dissolved carbon to produce a carbon oxide gas product which is removed as a product stream from said reactor; cooling said molten metal bath by sequtentially thermally converting in said bath, in any order, both said hydrogen rich feed, in the absence of added oxygen, to produce a high purity, at least 90+ mole % hydrogen, hydrogen gas product which is removed as a product stream from said reactor anid carbon which dissolves in said molten metal bath, and hydrogen deficient feed to produce a low purity hydrogen gas product stream, having a lower hydrogen purity than said high purity hydrogen gas stream, which is removed as a product stream from said reactor and carbon which dissolves in said molten metal bath; and repeating this sequence of processing steps.

In a more specific embodiment, the present inventioin provides a heat balanced, molten metal process for sequentially converting a hydrogen rich feed comprising a distillable or normally gaseous hydrocarbon to essentially pure hydrogen and a hydrogen deficient feed comprising a carbon containing solid or a non-distillable hydrocarbon liquid to a low hydrogen content vapor product in a single molten metal bath comprising heating a molten metal bath containing dissolved carbon by adding oxygen or an oxygen containing gas at an oxygen gas rate to said bath and exothermically oxidizing in said bath at least a portion of said dissolved carbon to produce a carbon oxide gas product with a $H_2$:CO ratio below 1.0, molar basis, which is removed as a product stream from said reactor; processing sequentiatlly in said bath and thermally converting, in any order, both said hydrogen rich feed, in the absence of added oxygen, to produce at least 98+ mole % hydrogen, hydrogen gas product which is removed as a product stream from said reactor and carbon which dissolves in said molten metal bath, and said hydrogen deficient feed, in the presence of a 0–40% of a total amount of oxygen added to said process to produce a low purity hydrogen gais product stream, having less than 90 mole % $H_2$ and a $H_2$:CO ratio greater than 1.0, molar basis, which is removed as a product stream from said reactor and carbon which dissolves in said molten metal bath, and repeating this sequence of steps.

DESCRIPTION OF THE PREFERRED EMBODIMENTS

Figure 1:
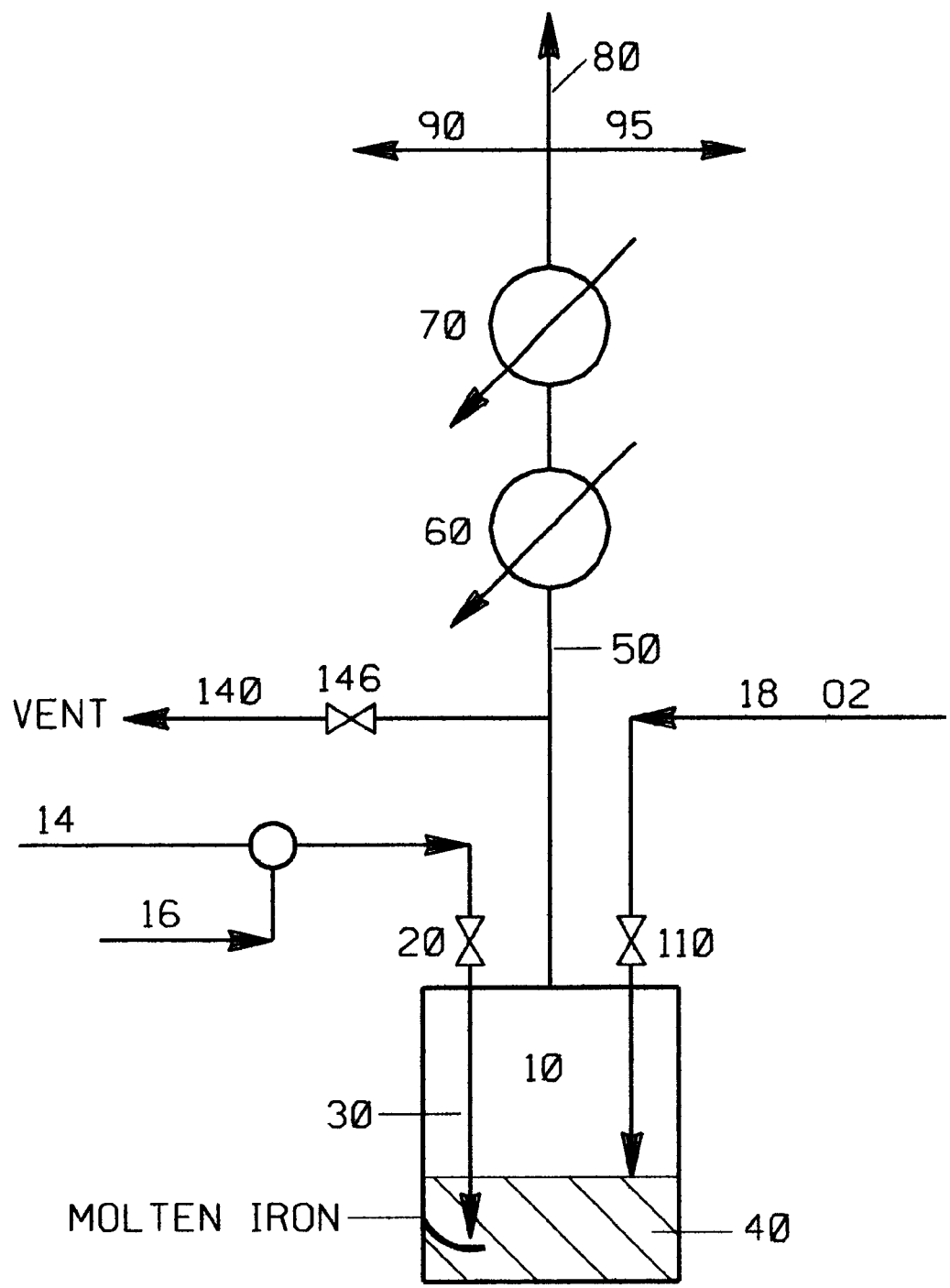
FIG. 1 is a schematic view of a swing valve system for a chamber molten metal reactor hiaviiig common headers for the two hydrocarbon feeds, oxygen and gas product removal.
Figure 2:
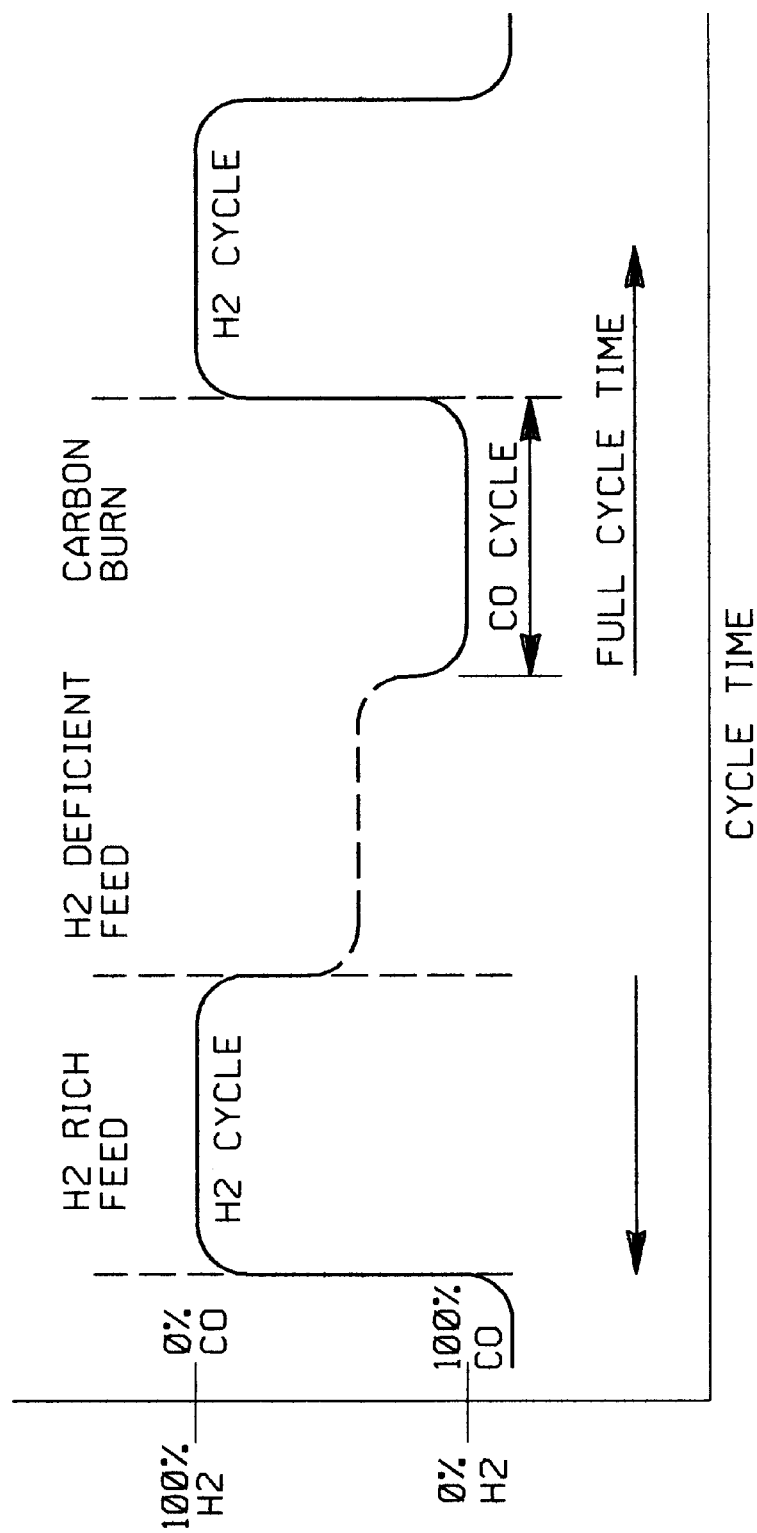
FIG. 2 is a plot of the percent purity of hydrogen product gas versus time for the swing system of FIG. 1.

HYDROGEN RICH FEED MATERIALS:

Natural Gas ($CH_4$), liquefied petroleum gas (LPG), propane, petroleum naphta, light or heavy distillate. Normally gaseous hydrocarbons are preferred. Especially preferred are ethane and methane which can produce substantially pure hydrogen.

HYDROGEN DEFICIENT FEED MATERIALS:

Vacuum and other resids, solvent deasphalted pitch (SDA), aromatic extracts, FCC slurry oil, trash, garbage, tires, coal, virtually any other hydrocarbon-containig material. Many of these materials heave significant amounts of hydrogen, but for purposes of the present invention they may be considered hydrogen deficient. Preferred low hydrogen content feeds are solvent deasphalter (SDA) bottoms, residuum from the vacuum distillation tower and coal. Petroleum coke, a suitable feed, has about a 0.1:1 H:C ratio.

PRODUCTS:

The process will always produce a pure hydrogen product and in addition one or more products of significantly lower purity. The hydrogen, or clean fuel product, is reviewed first, followed by a review of the reduced hydrogen purity product, or dirty fuel product, and flue gas product.

CLEAN FUEL

The processing of $H_2$ rich feed can produce extremely pure industrial hydrogen, generally with a hydrogen purity in excess of 90 mole %, and preferably in excess of 95, 98 or even 99 mole %. If clean, light feeds are used, and if the rest of the process is operated properly, the vapor product will have few impurities, perhaps a minor amount, usually less than 1 mole % of $H_2S$. This vapor stream might property be labeled the "clean fuel" product.

Such high purity operation cannot be sustained for long. The conversion of such light, $H_2$ rich materials is highly endothermic. The energy needed to drive this reaction comes from the sensible heat of the molten metal bath. Even continuously burning the carbon (from the light fuel) addition to the molten metal bath would not be sufficient to maintain a heat-balanced operation.

DIRTY FUEL

To get more fuel in the bath, the process must operate for a time with a carbon-rich, hydrogen-deficient feed. During this period of operation, relatively large amounts of carbon are added to the metal bath, releasing a vapor product that might be termed a "dirty fuel". Products are $H_2$, plus $H_2S$ and other contaminants in feed.

FLUE GAS:

During carbon oxidation, the off-gas will also contain CO and/or $CO_2$. This material may have significant combustion potential, especially if mutch of the product of carbon combustion is carbon monoxide rather than carbon dioxide.

CONTROLS:

Conventional analog or digital controls may be used, measuring temperature, preferably with optical or infrared pyrometer or protected thermocouple; carbon by spectrometers; level by nuclear radiation and adjusting reflective amounts of feed to maintain temperature. Temperature of the molten metal is preferably 1150° C. to 1600° C., more preferably 1250° to 1500° C. Reactor temperature drops quickly during addition of $H_2$ rich feed, usually more slowly during addition of the $H_2$ deficient feed, and increases with oxygen addition. Reactor temperature may swling 250° to 400° C., preferably 50° C. to 150° C. during each cycle.

The swing can be controlled on the basis of elapsed time, mass fed percent carbon in molten metal, product purity, or other variables.

PRESSURE

The process of the present invention can work well at atmospheric pressure. The hydrogen product is much more valuable if produced at a pressure of at least 2 atm., absolute, and preferably at 5 atm., absolute or higher.

It is possible to run every sequence of the process at superatmospheric pressure, or to run only thie clean fuel (high purity H2) part at High pressure with the carbon burn step operated at lower pressure, or at atmospheric pressure.

APPARATUS:

The present invention can work well using a simple, single chamnber reactor or crucible containing molten metal. This reactor is sequentially fed two different hydrocarbon feeds to produce product gas with varying hydrogen purities and preferably an oxygen-containinig gas to produce carbon monoxide and/or dioxide. The invention call use a swing valving sequence which connects tihe reactor to a ligh purity hydrogen header for collecting pure hydrogen , and one or more dirty fuel gas headers. Swing valves arc preferably located downstream of product heat-exchangers for lower temperature operation. A vent may purge gas lines during feed transition periods.

Minimum dissolved carbon level during occasional carbon oxidation cycles may be further reduced to periodically oxidize any sulfur in the melt and metals such as vanadium. Vanadium may be periodically purged from thle melt by oxidation.

TABLE A

| Parameter | Units | Preferred | More Preferred | Most Preferred |
|---|---|---|---|---|
| Molten Metal Temp | ° C. | 1150–1600 | 1250–1550 | (50–150° C. above melting pt. during oxidizing cycle) |
| $H_2$ Lean Feed H:C | molar | LT 1 | LT 0.6 | LT 0.2 |

TABLE A-continued

| | | PROCESS | | |
|---|---|---|---|---|
| Parameter | Units | Preferred | More Preferred | Most Preferred |
| $H_2$ Rich Feed H:C | molar | 1 or more | 1.5 or more | 1–4 |
| Cycle Control Responsive to: | Wt. % C. Melt time | 0.2–4.5% 2–30 min. | 0.5–4 5–25 | 1–3 wt. % C. 10–15 |
| Pressure | atm | 2–60 | 6–50 | 10–40 |
| Temperature | ° C. | 1150–1600 | 1250–1550 | 1350–1500 |
| Temp. @ Valve | ° C. | 100–400 | 150–350 | 200–300 |
| Cycle Duration | min | 1–30 | 1.5–15 | 2–6 |

TABLE B

| | PRODUCT COMPOSITIONS | | | |
|---|---|---|---|---|
| Parameter | Units | Preferred | More Preferred | Most Preferred |
| CO Product Purity | mol % CO | 90–100 | 97–100 | 99–100 |
| $H_2$ Product Purity | mol % $H_2$ | 90–100 | 95–100 | 99–100 |
| Fuel Gas Product Purity | mol % $H_2$ | 60–95 | 65–94 | 70–90 |

The operation of the process will be discussed in connection with a review of a complete cycle of operation, comprising three distinct modes of operation:

$H_2$ Rich Feed Cycle, $H_2$ Deficient Feed Cycle, and

Carbon Burn Cycle

FIG. 1 shows schematically a swing valve system for molten metal reactor 10 receiving $H_2$ rich feed in line 14 and $H_2$ deficient hydrocarbon feed Source 16, in this case (SDA). Each cycle is reviewed seriatim.

DEFICIENT FEED CYCLE:

The SDA pitch in line 16 is fed first to reactor 10 through inlet valve 20 and down through a penetrating lance 30 into molten iron bath 40. Lance 30 is insulated and the flow rate is sufficientt so that the pitch reaches its decomposition temperature only when it is in or very close to contact with the molten iron in the reactor. This provides almost instant dissolving of the carbon released from the pitch and avoids coke or carbon deposits or soot in the reactor gas phase. The pitch decomposes into a low $HO_2$ purity product released through outlet line 50, coolers 60 and 70 where it is cooled to about 275° C. This gas flows through line 80 durinig this portion of the cycle.

CARBON BURN CYCLE:

After a preset time, about three minutes in this example, feed addition is stopped, inlet valve 20 closing on reactor 10 and flow of oxygen initiated through line 18 and oxygen inlet valve 110 opening substantially simultaneously. $O_2$ flows in via line 18 and 9 mix of $CO/CO_2$ is removed through line 95.

HYDROGEN-RICH FEED CYCLE:

After three minutes of carbon burning, feed is switched to high H2 feed in line and oxygen valve 110 closes. Product is discharged through line 90 to a hydrogen storage tank.

If desired, vapors may be vented via line 140 and valve 146 between some or all cycles.

Figure 3:
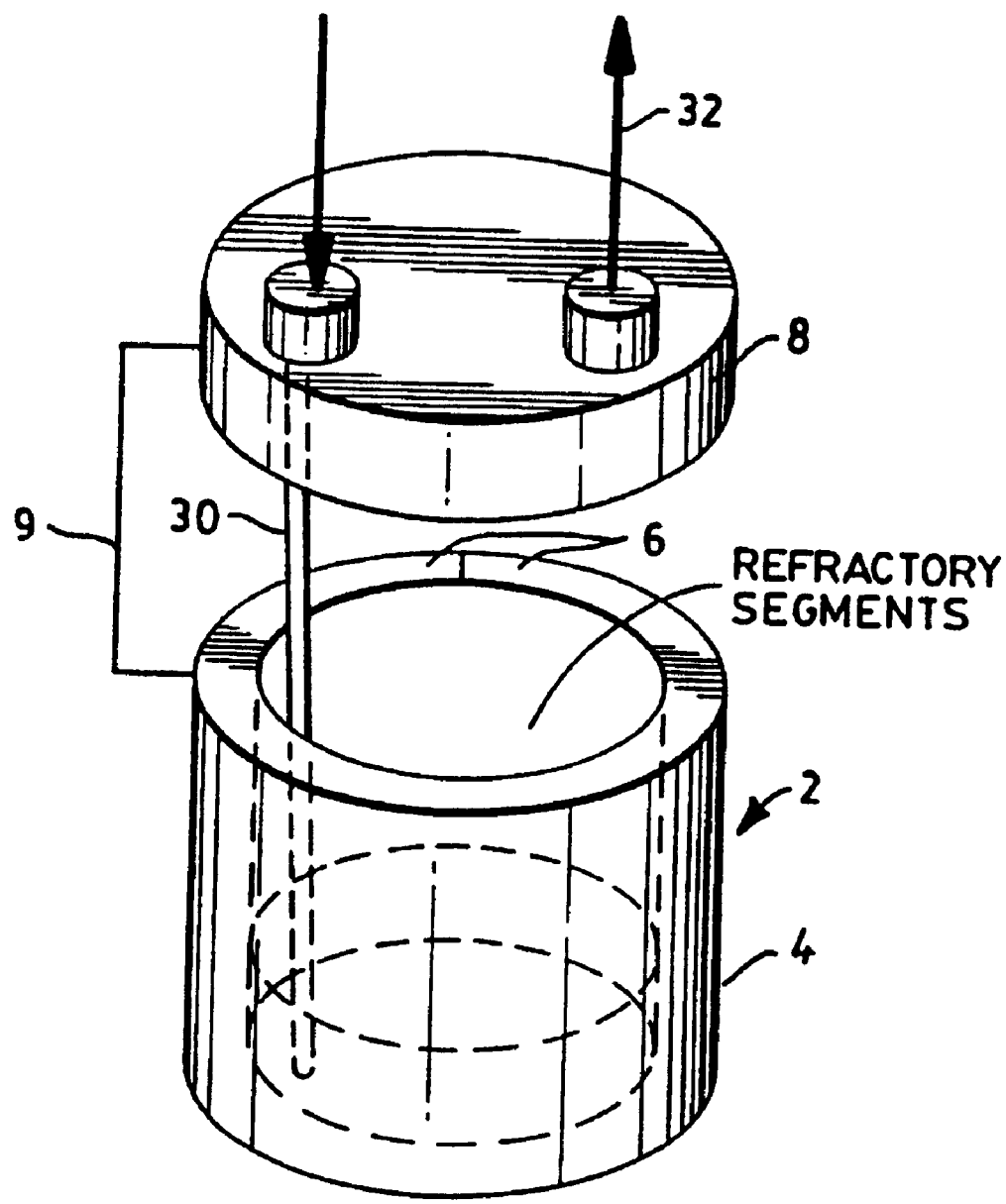
FIG. 3 is an explodcd, perspective view of FIG. 1.
Figure 4:
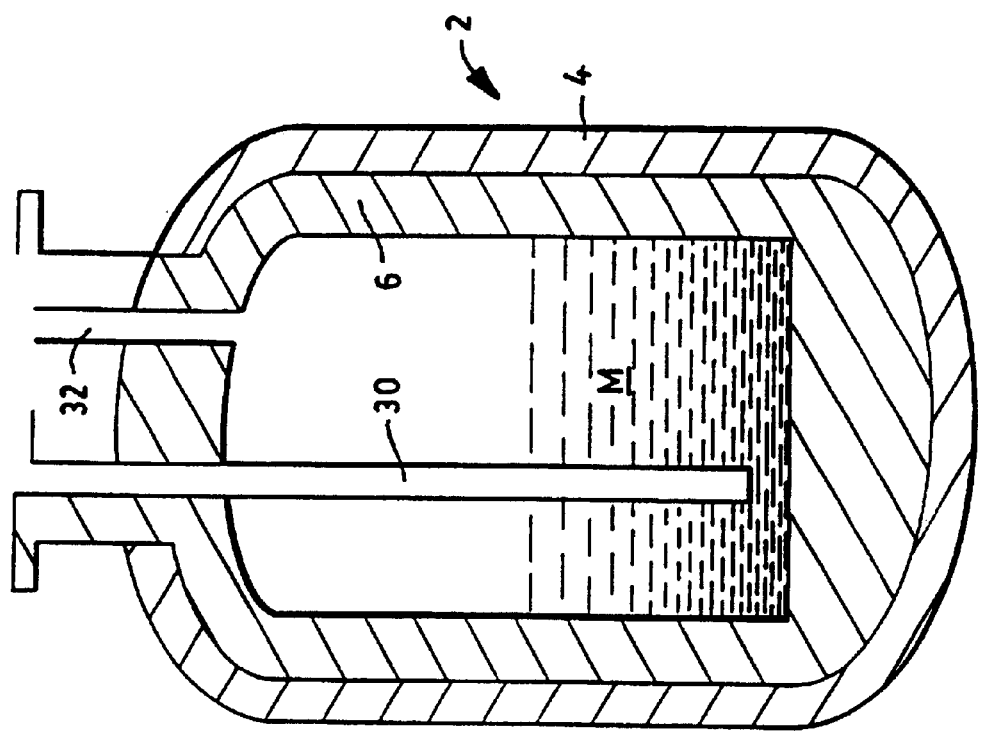
FIG. 4 is a more detailed sectional view of a molten metal reactor in an alloy pressure vessel with rammed thermal insulation.

Crucible 2 (FIG. 3) shows a pressure-tight steel housing 4, with segmented refractories 6 for simplicity in construction and reduction of thermal expansion effects and has an inlet lance 30 (sparging tube) for feed and an outlet 32 for product gases. Both are preferably located in the head 8 of crucible 2, coupled to the body of the crucible by tie rods 9, FIG. 3. FIG. 4 shows how a molten bath M is disposed within crucible 2 and the placement of inlet lance 30 within the molten metal bath, M.

TWO-MODE V. THREE-MODE OPERATION

Depending on product demands, it is possible to operate with two different feeds (one hydrogen rich and one hydrogen deficient) and produce two or three distinct product vapor streams.

THREE MODE OPERATION

Three mode operation is preferred. It involves sequencing the reactor successively through a carbon burning stage, followed by processing, seriatim, either the hydrogen rich or the hydrogen deficient feed.

I prefer the sequence:

Carbon Burn $H_2$ Deficient Feed $H_2$ Rich Feed

A carbon burn cycle is always needed to generate the heat needed to drive the moderately and highly endotlhennic conversion of the $H_2$ deficient and $H_2$ rich feeds, respectively. The reactor must be heated enough in the carbon burn cycle to remain molten during all subsequent downstream processing, including two cycles during which the reactor will convert feeds endothermically.

The viscosity of the molten bath changes both with temperature and with carbon concentration. The reactor should not be operated so near "the edge" that minor fluctuations in feed rate or quality will cause neither bed solidification nor reactor meltdown. A swling of about 150°–200° C., from say 1250°–1450° C. provides a reasonably wide operating window.

Carbon level in the rnolten metal bath plays a role too. The tupper limit on carbon level may be set by needs to maintain a more reducing atmosphere in a subsequeut processing step. Usually it is preferred to deeply decarbonize the bed, both to ensure that carbon particles will not form in domnstream processing steps (and contaminiate, the product gas) and to keep the bed from being too reducing. Many times the hydrogen deficient feed will contain significant amounts of reducible impurities, such as sulfur. When a clean, essentially sulfur free Hydrogen product is desired it may be beneficial to operate with a low carbon content bed so that any sulfur which finds its way into the molten metal will be released as a sulfur oxide rather than as $H_2S$.

The carbon level at the start of the carbon burn portion of the cycle will generally be below 4.0 wt. %, preferably below 3.0 wt. % and most preferably below 2.0 wt. %. This is the high point of carbon content, just before oxygen addition. Preferably the carbon content is at least 50% removed during the carbon burn cycle. The bed should contain less than 2.0 wt. % carbon, preferably less than 1.5 wt. % carbon, and most preferably less than 1.0 wt. % carbon.

The oxidant used to remove carbon is preferably putr oxygen, through oxygen enriched air or other oxygen containing stream may also be used. The gas removed from the bed during the oxidation part of the cycle will usually contain large amounts of CO.

The next step in three mode operation will be endothermic conversion of either the $H_2$ rich or the $H_2$ deficient feed.

When high hydrogen purity, and low sulfur/contaminant levels in the hydrogen product are desired, the $H_2$ rich feed will be processed after decarbonization of the bed. The molten metal bath will be clean and hot. High temperatures will rapidly convert the feed to hydrogen gas, recovered as a vapor product from the reactor, and carbon which dissolves rapidly in the molten metal bath. After a preset time, or after some other condition is reached such as a dT of 50° C. or 100° C. in reactor off-gas, the processing of the remaining feed will begin. This would involve charging the $H_2$ deficient feed to the reactor. Such feeds will usually contain significant amounts of impurities and produce a significantly lower purity $H_2$ product.

After the desired amounts of both the $H_2$ rich and the $H_2$ deficient feed have een processed, the decarbonization cycle will commence again to repeat the cycle.

TWO MODE OPERATION

In two mode operation, the reactor still processes two different feeds, and still produces an extremely pure hydrogen gas product, while the $H_2$ deficient feed receives slightly different handling. In this case the product purity of the "dirty ftiel" is not important. This might be the case when the dirty fuel is to be burned while the clean hydrogen is used in a hydrotreater or the like.

During processing of the hydrogen deficient feed, it is possible for some or all of these cycles to add oxygen simnultaneous with the feed. Suclh simultaneous addition of hydrocarbon and oxygen is feasible and reported in the patent literature. The effect is to combine both decarbonization (highly exothertmic) and thermal conversion of the $H_2$ deficient feed (endothermic). Overall, this step must be exothermic, providing enough of a temperature boost so that there will be sufficient excess sensible heat to drive the highly endothermic conversion of the $H_2$ rich fuel in the absence of added oxygen.

BLENDED THREE MODE OPERATION

It is also possible to usc a hybrid approach, with a limited amount of oxygen addition during some or all of the period when the hydrogen deficient fuel is being processed.

FLYWHEEL PROCESS:

The process of the present invention, in a sense, uses the molten metal bath as a flywheel to smooth out swings in temperature and carbon concentration, and to squeeze the maximnumn potential out of disparate feedstocks.

The molten metal bath handles two swings, temperature and composition. The temperature climbs to a high point at the end of the carbon burn cycle. This provides a reservoir of sensible heat, and allows the temperature to coast down while providing the thermal energy necessary for endothermic processing of hydrogen rich and hydrogen deficient fuels.

While the molten metal bath is losing sensible heat, it is acquiring potential energy, in the form of dissolved carbon.

Preferably the amount of dissolved carbon picked up in each part of the cycle of the process is not enough to maintain heat balanced operation. Thus the hydrogen rich feed, e.g., methane, loses more energy during hydrogen release and carbon dissolution than will be gained by burning from the bath this dissolved carbon. In a complementary manner, the hydrogen deficient feed, e.g., pitch, adds too much dissolved carbon relative to the amount of hydrogen released. The net effect of sequentially processing these different feeds is to obtain a heat balanced operation, with at least one of the streams having an extremely high hydrogen purity.

MODIFICATIONS

Reference to documents made in the specification is intended to result in such patents or literature being expressly incorporated herein by reference.

What is claimed is:

1. A heat balanced, molten metal process for sequentially converting at least two different feedstocks, a hydrogen rich feed having a carbon:hydrogen mole ratio no greater than 1:1 and a hydrogen deficient feed having a carbon:hydrogen mole ratio greater than that of said hydrogen rich feed, in a single molten metal bath thermal reactor to produce at least two product vapor streams comprising:

a) heating a molten metal bath containing dissolved carbon by adding oxygen or an oxygen containing gas at an oxygen gas rate to said bath and exothermically oxidizing in said bath at least a portion of said dissolved carbon to produce a carbon oxides gas product which is removed as a product stream from said reactor;

b) cooling said molten metal bath by sequentially thermally converting in said bath, in any order, both said:

hydrogen rich feed, in the absence of added oxygen, to produce a hydrogen gas product comprising at least 90 mole % of hydrogen which is removed as a product from said reactor and carbon which dissolves in said molten metal bath, and hydrogen deficient feed to produce a hydrogen gas product stream comprising less than 90 mole % H2, which is removed as a product stream from said reactor and carbon which dissolves in said molten metal bath; and c) repeating the sequence from step a.

2. The process of claim 1 wherein processing of at least said hydrogen rich feed occurs at a pressure of at least two atmospheres, absolute.

3. The process of claim 1 wherein all steps of said sequential process occur at a pressure of at least two atmospheres, absolute.

4. The process of claim 1 wherein said hydrogen rich feed is a gaseous or distillable liquid hydrocarbon, and has a hydrogen:carbon mole ratio of at least 1:1.

5. The process of claim 1 wherein said hydrogen deficient feed comprises a non-distillable hydrocarbon or a carbon containing solid.

6. The process of claim 1 wherein processing of said hydrogen rich feed by itself does not add enough carbon to the molten metal bath to permit heat balanced operation of the process and processing said hydrogen deficient feed by itself adds too much carbon to the molten metal bath to permit heat balanced operation of the process.

7. The process of claim 1 wherein processing of said hydrogen deficient feed occurs simultaneously with addition of at least some oxygen containing gas to said bath.

8. The process of claim 1 wherein processing of said hydrogen deficient feed occurs in the absence of oxygen addition to said bath.

9. The process of claim 1 wherein three distinct product vapor streams are produced:

a product stream comprising at least 99 mole % $H_2$;

a product stream comprising 10–90 mole % of hydrogen; and a CO and CO2 rich gas product stream.

10. A heat balanced, molten metal process for sequentially converting a hydrogen rich feed comprising a distillable or normally gaseous hydrocarbon to essentially pure hydrogen and a hydrogen deficient feed comprising a carbon containing solid or a non-distillable hydrocarbon liquid to a low hydrogen content vapor product in a single molten metal bath thermal reactor comprising:

a) heating a molten metal bath containing dissolved carbon by adding oxygen or an oxygen containing gas at an oxygen gas rate to said bath and exothermically oxidizing in said bath at least a portion of said dissolved carbon to produce a carbon oxides gas product with a $H_2$:CO ratio below 1.0, molar basis, which is removed as a product stream from said reactor;

b) processing by sequentially thermally converting, in any order both said:

hydrogen rich feed, in the absence of added oxygen, to produce, a hydrogen gas product comprising at least 98 mole % of hydrogen which is removed as a product stream from said reactor and carbon which dissolves in said molten metal bath, and hydrogen deficient feed, in the presence of a 0–40% of a total amount of oxygen added to said process to produce:

a hydrogen gas product stream, comprising less than 90 mole % $H_2$ and a $H_2$:CO ratio greater than 1.0, molar basis, which is removed as a product stream from said reactor and carbon which dissolves in said molten metal bath, and c) repeating the sequence from step a.

11. The process of claim 10 wherein processing of said hydrogen deficient feed occurs simultaneously with addition of 5% to 25% of the total amount of oxygen containing gas added top the process.

12. The process of claim 10 wherein processing of said hydrogen deficient feed occurs in the absence of added oxygen.

13. The process of claim 10 wherein the processing sequence is: oxygen addition to remove carbon; hydrogen rich feed addition to product 98+ mole % hydrogen; and hydrogen deficient feed addition to produce a lower purity hydrogen gas relative to said 98+ mole % hydrogen gas and having a hydrogen purity of 60–95 mole % hydrogen.

* * * * *